May 13, 1969     H. E. WAGNER ET AL     3,443,590
FLUID SUPPLY APPARATUS
Filed Oct. 31, 1966
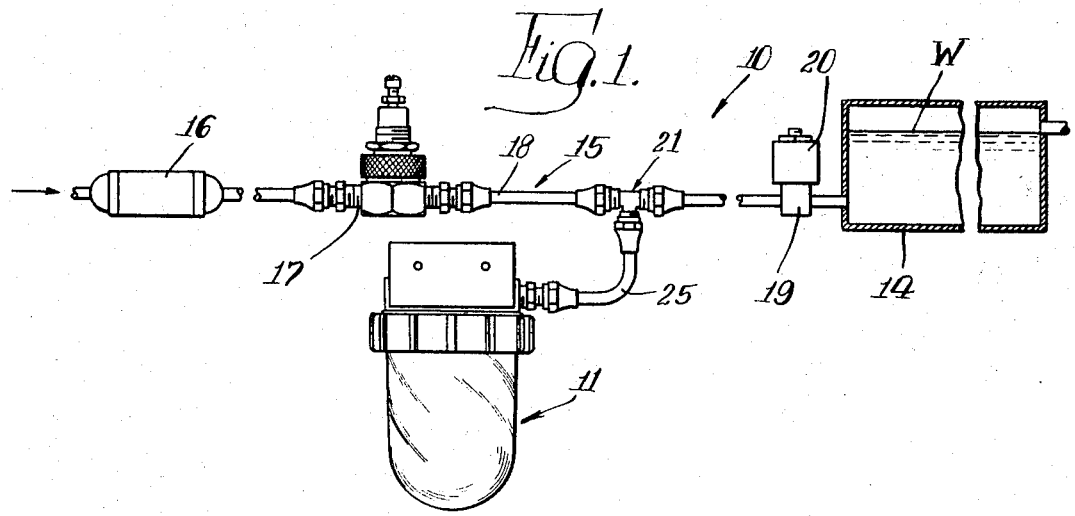
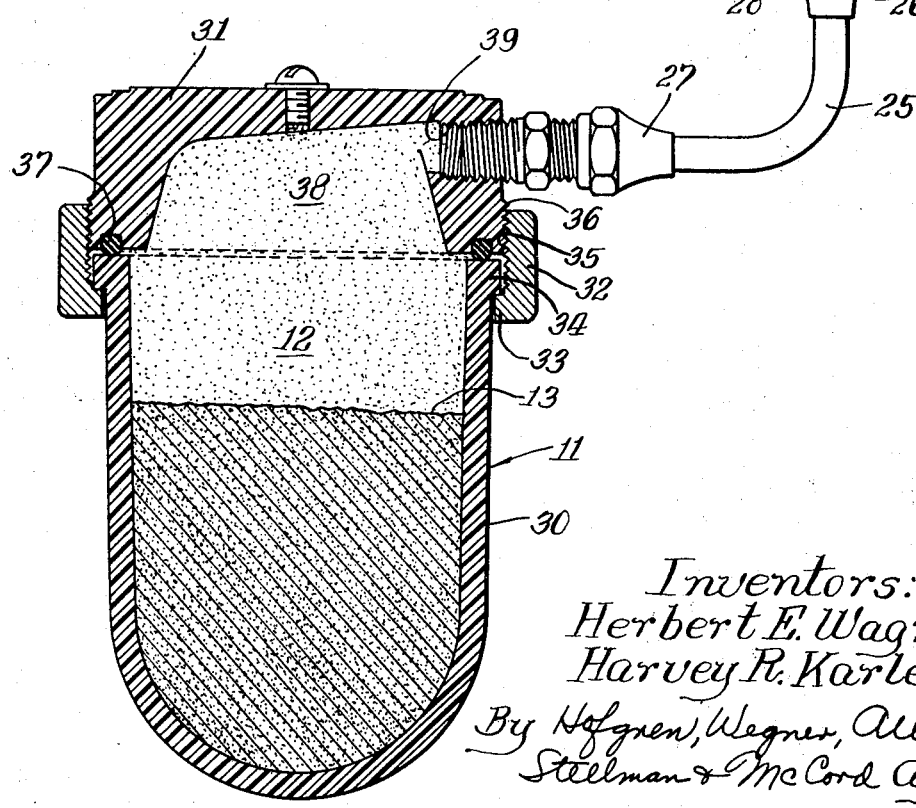
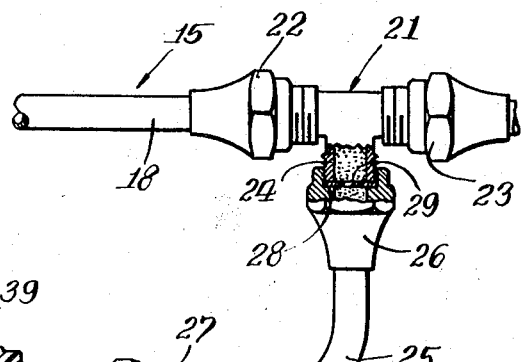
Inventors:—
Herbert E. Wagner,
Harvey R. Karlen
By Hofgren, Wegner, Allen,
Stellman & McCord Attys.

United States Patent Office 3,443,590
Patented May 13, 1969

3,443,590
FLUID SUPPLY APPARATUS
Herbert E. Wagner, Tinley Park, and Harvey R. Karlen, Chicago, Ill., assignors to Cory Corporation, a corporation of Delaware
Filed Oct. 31, 1966, Ser. No. 590,967
Int. Cl. B67d 5/58
U.S. Cl. 137—604    9 Claims

ABSTRACT OF THE DISCLOSURE

A fluid supply apparatus for use with an intermittent fluid delivery means. The apparatus is arranged to have fluid delivered into a treating material storage chamber when the flow is interrupted and pass outwardly from the chamber into the fluid flow stream when the flow is reinitiated. The storage space means is defined by a resilient wall. The resilient wall may comprise a resilient plastic cover on a storage tank.

---

This invention relates to a fluid supply apparatus and in particular to means for feeding controlled quantities of material into a fluid supply.

In certain fluid supply systems, it is desirable to provide controlled quantities of material into the fluid being delivered through the system. One example of such a fluid supply system is the cold water supply to a coffee brewing apparatus. In such coffee brewing apparatus, the water is heated to near boiling temperature and thus severe scale and corrosion problems may occur. It is desirable, therefore, to provide in the water supply water conditioning chemicals such as polyphosphates to alleviate the scale and corrosion problems.

In such coffee brewing devices, a further problem arises in that the delivery of the water to the coffee brewer is normally intermittent. Illustratively, the coffee is brewed in such devices in substantial quantities and delivered to suitable relatively large quantity storage devices, such as tanks or decanters. Thus, the cold water supply to the brewing device is frequently closed and opened. Conventional devices for providing water conditioning chemicals in such intermittent supply devices have not proven completely satisfactory in that they tend to vary in the quantity of the material supplied due particularly where relatively small quantities of such additive materials are involved.

The present invention is concerned with the provision of a new and improved fluid supply apparatus arranged to provide chemicals such as water conditioning chemicals to a fluid supply such as a cold water supply to a beverage brewing device in accurately controlled small quantities and in a novel and simple manner.

Thus, the principal feature of the present invention is the provision of a new and improved fluid supply apparatus.

Another feature of the invention is the provision of such a fluid supply apparatus having new and improved means for automatically introducing a preselected small quantity of chemical material into the fluid being supplied.

A further feature of the invention is the provision of such a fluid supply apparatus having new and improved means for effecting the delivery of the chemical wherein the chemical delivering means is free of moving parts.

A yet further feature of the invention is the provision of such a fluid supply apparatus including means defining a through fluid flow passage having an inlet portion and an outlet portion, means defining a branch flow passage having one end in communication with the through passage intermediate the inlet portion and the outlet portion, orifice means at the one end of the branch passage for controlling fluid flow between the through and branch flow passages, resilient wall means defining a storage space communicating with the branch flow passage and arranged to hold fluid treating material; and means for selectively closing and opening said outlet portion whereby fluid is urged by the pressure thereof from the through flow passage into the branch flow passage and causes the storage space means to become resiliently extended when the closing means closes the outlet portion and the storage space means resiliently contracts to urge fluid and material carried thereby from the branch flow passage into the through flow passage when the closing means opens the outlet portion.

Another feature of the invention is the provision of such a fluid supply apparatus wherein the means defining the storage space is formed of a number of different members having different resiliency characteristics, one of said members defining a mixing zone at the upper portion of the storage space and having a relatively low resiliency characteristic.

Other features and advantages of the invention will be apparent from the following description taken in connection with the accompanying drawing wherein:

FIGURE 1 is a side elevation of a fluid supply apparatus embodying the invention in association with a fluid supply means and a fluid receiving means; and FIGURE 2 is an enlarged fragmentary elevation of a portion thereof with the storage space means shown in diametric section.

In the exemplary embodiment of the invention as disclosed in the drawing, a fluid supply apparatus generally designated 10 is shown to comprise a container 11 defining a storage space 12 in which a quantity of fluid treating chemical 13 is provided. The apparatus 10 is arranged to deliver the chemical 13 in preselected small quantities from the storage space 12 into a fluid such as cold water W being delivered to a receiver such as tank 14 through a supply line generally designated 15. While the invention is illustrated in connection with the conditioning of such a cold water supply, the invention obviously comprehends the provision of small quantities of any suitable chemical into any suitable fluid.

More specifically, as shown in FIGURE 1, the cold water may be provided to the apparatus 10 from a suitable pressure supply (not shown) through a filter 16, and thence through a conventional pressure regulator 17 to a conduit 18 connected to the tank 14. A suitable valve 19 is provided in the conduit 18 for controlling the delivery of the water into the tank. Herein, valve 19 includes a solenoid operator 20 for suitable electrical operation thereof. Thus, when valve 19 is open, water may flow under the controlled pressure of regulator 17 through conduit 18 into the tank 14 as desired.

As discussed briefly above, tank 14 may comprise a heating tank of a brewing apparatus wherein the hardness of the water W may present a serious scaling and corrosion problem. To alleviate such a problem it is desirable to introduce into the water a small quantity of softening or conditioning chemical 13. Illustratively, chemical 13 may comprise conventional polyphosphate water conditioning material provided in the water W in a ratio of approximately two parts per million. The amount of chemical 13 to be provided in the water may be varied in accordance with the hardness of the water and similar factors.

As shown in FIGURE 2, a T connector 21 is provided in the conduit 18 at a point between pressure regulator 17 and valve 19. The T connector may be suitably connected in the conduit by conventional fittings 22, 23. The leg 24 of the T connector is connected to a conduit 25 by means of a conventional fitting 26, and the conduit 25, in turn, is connected to the storage container 11 by a conventional fitting 27. A disc 28 is provided in the fitting 26 at the lower end of the T connector leg 24. Disc 28 defines a small axial orifice 29 through which fluid may flow from conduit 18 to conduit 25 and from conduit 25 back to conduit 18. The container 11 includes a lower bowl portion 30 and a top cover portion 31 sealingly removably connected to portion 30 by a retaining ring 32 having a flange portion 33 cooperating with an annular flange 34 of the bowl 30 and a threaded inner surface 35 cooperating with a threaded outer surface 36 on the cover 31. A sealing ring 37 may be provided in the cover 31 to sealingly engage the upper end of the flange 34 for sealingly closing the space 12 in the assembled arrangement of the container 11, as shown in FIGURE 2.

The cover 31 is provided with a downwardly opening recess defining a mixing zone 38 at the upper end of space 12. Fitting 27 provides communication between conduit 25 and mixing zone 38, being threaded into a suitable threaded port 39 opening into zone 38. Cover 31 herein is formed of a nonmetallic material such as plastic having a relatively low resiliency. One example thereof is the polycarbonate plastic Lexan. Bowl 30 herein is formed of a nonmetallic material such as a plastic having a relatively greater resiliency. One example of a suitable plastic bowl material is the acrylic resin Tyrel. Conduit 25 may be formed of a rigid material such as metal.

Where apparatus 10 is provided for delivering conditioned water W to the tank 14 of a beverage brewing apparatus, pressure regulator 17 may be arranged to regulate the incoming water supply pressure at approximately 8 to 10 pounds per square inch pressure. The orifice 29 may comprise an orifice having a small diameter such as approximately .03 inch, and the container 11 may be suitably arranged to provide a space 12 having a volume of approximately 100 cubic inches. Chemical 13 may be a polyphosphate water conditioner material. In operation of such an apparatus 10, when the valve 19 is closed, the supply pressure causes a small quantity of water to be urged from conduit 18 downwardly through the leg 24 of the T 21. This pressure is resisted by the limited resilient expansion of the bowl 30 so that only a small flow of the water through the orifice is permitted. As the orifice 29 is of relatively small size, it effectively limits the diffusion of the chemical 13 from container 30 into conduit 18 notwithstanding the fact that the valve 19 may subsequently be closed for a relatively long period of time. The small flow of water from conduit 18, however, tends to dilute the solution of water and chemical 13 in the container 30 and conduit 25 a small amount and thus causes a small additional amount of the chemical 13 to be dissolved in this water at that time.

When the valve 19 is opened, the resiliency of the container 11 responds to the reduction in pressure in the conduit 18 by contracting to its normal unstressed configuration causing a small quantity of the solution of water and chemical 13 to pass from conduit 25 through orifice 29 into the water flowing through conduit 18 to the tank 14. Once this small quantity of solution is introduced into the water flowing through conduit 18, the equalization of pressure across orifice 29 effectively precludes the delivery of further concentrate solution from the container 11.

Thus, the invention comprehends the provision of structure associated with the container 11 for responding to the different pressure conditions in the conduit 18 to prevent a variation in the volume of space 12 whereby a small quantity of the fluid being treated is drawn through the orifice of the container 11 when the valve 19 is closed and a small quantity of the concentrate solution is withdrawn through the orifice 29 each time the valve 19 is opened. As will be obvious to those skilled in the art, the variation in the space 12 may be provided by other suitable structures such as resilient diaphragm or piston means bounding a portion of the space 12. Alternatively, an air chamber may be provided in communication with space 12 to act as an air spring in effecting the desired flow through the orifice.

While we have shown and described one embodiment of our invention, it is to be understood that it is capable of many modifications. Changes, therefore, in the construction and arrangement may be made without departing from the spirit and scope of the invention as defined in the appended claims.

We claim:
1. Fluid supply apparatus comprising:
   means defining a through fluid flow passage having an inlet portion and an outlet portion;
   means defining a branch flow passage having one end in communication with said through passage intermediate said inlet portion and said outlet portions;
   orifice means at said one end of the branch passage for controlling fluid flow between said through and branch flow passages;
   resilient wall means defining a storage space communicating with said branch flow passage and arranged to hold fluid treating material, said storage space means including a plastic top portion defining a mixing zone at the upper portion of said storage space, said storage space means being constructed and arranged to provide resilient enlargeability of said space; and
   means for selectively closing and opening said outlet portion whereby fluid is urged by the pressure thereof from said through flow passage into said branch flow passage and causes said storage space means to become resiliently extended when said closing means closes said outlet portion and said storage space means resiliently contracts to urge fluid and material carried thereby from said branch flow passage into said through flow passage when said closing means opens said outlet portion.

2. The fluid supply apparatus of claim 9 wherein said storage space means includes a top portion defining a mixing space at the upper portion of said storage space and a lower bowl portion having a resilient enlargeability greater than that of said top portion.

3. The fluid supply apparatus of claim 9 wherein the storage space means is formed of nonmetallic materials having a preselected small resiliency for causing a preselected small flow of solution from said storage space means through said orifice into said through passage upon each opening of said closing means.

4. The fluid supply apparatus of claim 1 wherein said branch flow passage means comprises a conduit formed of a substantially rigid metallic material.

5. The fluid supply apparatus of claim 1 wherein said orifice means defines an orifice having a diameter of approximately .03 inch.

6. The fluid supply apparatus of claim 1 wherein said storage space is approximately 100 cubic inches.

7. The fluid supply apparatus of claim 1 including means for regulating the pressure in said through passage upstream of the area of communication of said one end of the branch passage with said through passage.

8. The fluid supply apparatus of claim 7 wherein said pressure regulating means is arranged to regulate the pressure to approximately 10 p.s.i.

9. Fluid supply apparatus comprising: means defining a through fluid flow passage having an inlet portion and an outlet portion; means defining a branch flow passage having one end in communication with said through passage intermediate said inlet portion and said outlet portion; orifice means at said one end of the branch passage for controlling fluid flow between said through and branch flow passages resilient wall means defining a storage space communicating with said branch flow passage and arranged to hold fluid treating material; and means for selectively closing and opening said outlet portion whereby fluid is urged by the pressure thereof from said through flow passage into said branch flow passage and causes said storage space means to become resiliently extended when said closing means closes said outlet portion and said storage space means resiliently contracts to urge fluid and material carried thereby from said branch flow passage into said through flow passage when said closing means opens said outlet portion.

References Cited

UNITED STATES PATENTS

| | | | |
|---|---|---|---|
| 3,095,892 | 7/1963 | Laing et al. | 137—101.11 |
| 3,199,531 | 8/1965 | Cornelius et al. | 137—394 |
| 3,202,164 | 8/1965 | Thompson et al. | 137—101.11 |

FOREIGN PATENTS 573,875  4/1959  Canada.

LEONARD D. CHRISTIAN, *Primary Examiner.*